United States Patent
Bauer

(10) Patent No.: US 12,545,229 B2
(45) Date of Patent: Feb. 10, 2026

(54) STEERING CONTROL SYSTEM

(71) Applicant: Carlson Paving Products, Inc., Tacoma, WA (US)

(72) Inventor: Robert Bauer, Saint Croix Falls, WI (US)

(73) Assignee: Carlson Paving Products, Inc., Tacoma, WA (US)

( * ) Notice: Subject to any disclaimer, the term of this patent is extended or adjusted under 35 U.S.C. 154(b) by 565 days.

(21) Appl. No.: 17/985,480

(22) Filed: Nov. 11, 2022

(65) Prior Publication Data
US 2023/0071279 A1 Mar. 9, 2023

Related U.S. Application Data

(63) Continuation-in-part of application No. 16/739,365, filed on Jan. 10, 2020, now Pat. No. 11,524,718.

(60) Provisional application No. 62/790,748, filed on Jan. 10, 2019.

(51) Int. Cl.
*B60W 10/20* (2006.01)
*B62D 11/02* (2006.01)

(52) U.S. Cl.
CPC ............ *B60W 10/20* (2013.01); *B62D 11/02* (2013.01); *B60W 2510/20* (2013.01); *B60W 2520/00* (2013.01); *B60W 2710/081* (2013.01)

(58) Field of Classification Search
CPC ............ B60W 10/20; B60W 2510/20; B60W 2520/00; B60W 30/045; B60W 30/182; B60W 2520/10; B60W 2540/18; B62D 11/02
See application file for complete search history.

(56) References Cited

U.S. PATENT DOCUMENTS

| | | | |
|---|---|---|---|
| 3,917,015 A | 11/1975 | Hawkins | |
| 4,828,065 A | 5/1989 | Ishihara et al. | |
| 5,258,912 A * | 11/1993 | Ghoneim | B60T 8/246 701/42 |
| 5,787,374 A * | 7/1998 | Ferguson | B62D 11/183 180/6.7 |
| 6,233,516 B1 * | 5/2001 | Egawa | B60W 30/16 356/3 |
| RE38,632 E | 10/2004 | Schmidt et al. | |

(Continued)

OTHER PUBLICATIONS

Examination Report for related AU application No. 2023263440, dated Mar. 17, 2025, 7 pages.

*Primary Examiner* — Paul N Dickson
(74) *Attorney, Agent, or Firm* — Chambliss, Bahner & Stophel, P.C.; Stephen D. Adams

(57) ABSTRACT

A steering control system adapted for use on a vehicle having two or more wheels each configured to rotate about a rotational axis, at least one of the wheels being a driven wheel and at least one of the wheels being a turning wheel, and an automatic pivot steer mode. The system further comprises a vehicle speed sensor, a steering sensor, a steering control device, a speed control device, and a controller in communication with the speed sensor, the steering sensor, and the speed control device. The controller receives inputs from the speed sensor and the steering sensor and, if both inputs fall within a predetermined range, activates a speed control device thereby altering the rotational speed or direction of at least one of the two or more wheels of the vehicle, reducing the turning radius of the vehicle.

6 Claims, 6 Drawing Sheets

(56) References Cited

U.S. PATENT DOCUMENTS

| | | | |
|---|---|---|---|
| 10,836,426 B1 | 11/2020 | Busboom et al. | |
| 2004/0093139 A1 | 5/2004 | Wildey et al. | |
| 2004/0200657 A1* | 10/2004 | Stoll | B60K 17/356 |
| | | | 180/307 |
| 2004/0259681 A1* | 12/2004 | Sawada | B60K 28/16 |
| | | | 477/92 |
| 2007/0144797 A1 | 6/2007 | Tarasinski et al. | |
| 2007/0294009 A1* | 12/2007 | Yasui | B62D 6/003 |
| | | | 701/41 |
| 2012/0185142 A1* | 7/2012 | Meyers | B60T 8/1755 |
| | | | 701/70 |
| 2013/0211678 A1 | 8/2013 | Lee et al. | |
| 2014/0358354 A1 | 12/2014 | Pierce et al. | |
| 2015/0066298 A1* | 3/2015 | Sharma | E02F 9/0841 |
| | | | 701/41 |
| 2015/0259881 A1 | 9/2015 | Sharma et al. | |
| 2018/0201310 A1 | 7/2018 | Rotole | |
| 2018/0346020 A1 | 12/2018 | Bebernes et al. | |
| 2020/0056348 A1 | 2/2020 | Veasy et al. | |
| 2020/0114962 A1* | 4/2020 | Oetken | B60W 10/04 |
| 2020/0198700 A1 | 6/2020 | Benck et al. | |
| 2020/0291609 A1 | 9/2020 | Tevis et al. | |
| 2020/0391790 A1* | 12/2020 | Kamemura | B62D 5/006 |
| 2021/0271255 A1 | 9/2021 | Dix et al. | |
| 2022/0147047 A1 | 5/2022 | Liu et al. | |

\* cited by examiner

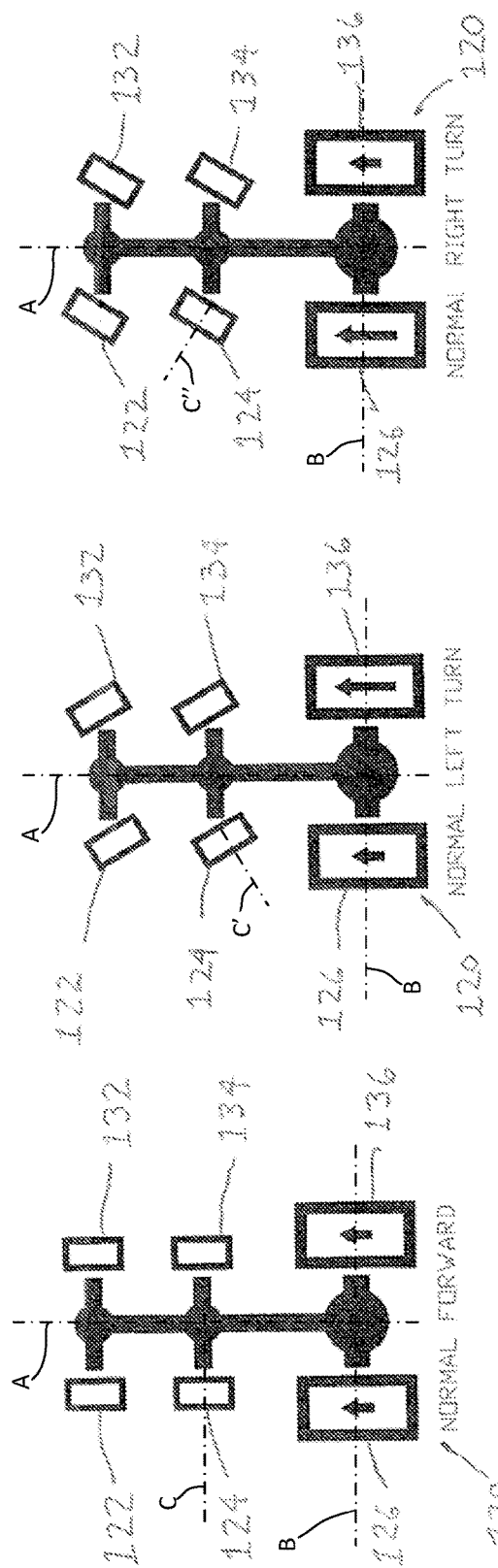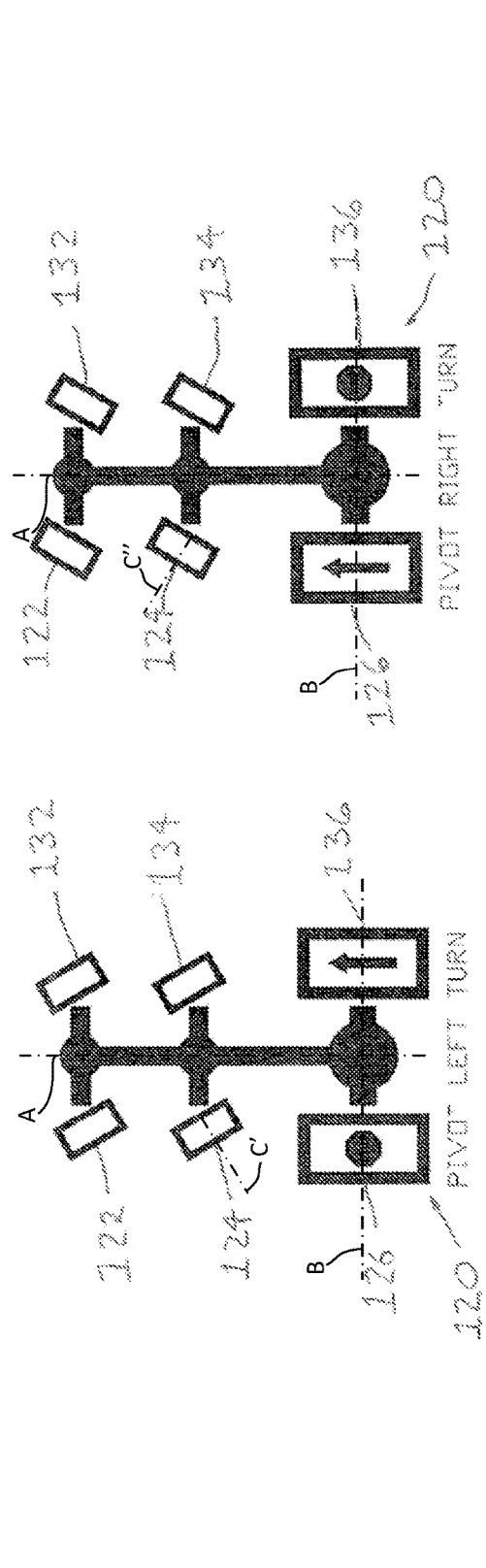

STEERING CONTROL SYSTEM

CROSS-REFERENCE TO RELATED APPLICATION

This is a continuation-in-part application of application Ser. No. 16/739,365, filed on Jan. 10, 2020, and entitled "APPARATUS AND METHOD FOR A STEERING CONTROL SYSTEM," which relates back to and claims the benefit of priority from U.S. Provisional Application for Patent Ser. No. 62/790,748 titled "Paving Machine Control Systems" and filed on Jan. 10, 2019; wherein the entire contents of the foregoing applications are hereby incorporated by reference in their entireties.

FIELD OF THE INVENTION

The present invention relates generally to controlling the movement of vehicles. More particularly, the present invention relates to a steering control system and vehicle control method for enabling pivot steering.

BACKGROUND

It is known to use apparatuses and methods to control the steering of wheeled vehicles, and particularly vehicles employing a pivot steer, more particularly road-building vehicles. Conventional apparatuses and methods, however, suffer from one or more disadvantages. For example, conventional control systems and methods do not automatically pivot steer the wheeled vehicle. Conventional control systems and methods are also undesirably labor-intensive and unsafe as they require the operator to remove his or her hands from the vehicle's motion controls, (e.g. the steering wheel or directional joystick). Further, conventional control systems and methods allow for pivot steering at any time the vehicle is moving and regardless of the vehicle's wheel position. Still further, conventional control systems and methods produce undesirable stress on a stationary wheel and its linkage when a pivoting wheel turns. In addition, improper pivot steering can damage the base pavement (i.e., the road surface over which the vehicle is traveling). Still further, an operator can accidentally engage pivot steer at an unsafe speed and possibly be thrown off the wheeled vehicle.

It would be desirable, therefore, if an apparatus and method for a steering control system could be provided that would automatically pivot steer the vehicle. It would also be desirable if such an apparatus and method for a steering control system could be provided that would not be undesirably labor-intensive and unsafe. It would be further desirable if such an apparatus and method for a steering control system could be provided that would not allow for pivot steering at any time the wheeled vehicle is moving at certain speeds and regardless of the machine's wheel position. It would be still further desirable if such an apparatus and method for a steering control system could be provided that would not produce undesirable stress on a stationary wheel and its linkage when a pivoting wheel turns or damage the base pavement. In addition, it would be desirable if such an apparatus and method for a steering control system could be provided that would not be capable of being accidentally engaged at an unsafe speed and possibly throw the operator off the wheeled vehicle.

Advantages of the Preferred Embodiments of the Invention

Accordingly, it is an advantage of the preferred embodiments of the invention claimed herein to provide an apparatus and method for a steering control system that automatically pivot steers the wheeled vehicle. It is also an advantage of the preferred embodiments of the invention claimed herein to provide an apparatus and method for a steering control system that is not undesirably labor-intensive and unsafe. It is another advantage of the preferred embodiments of the invention claimed herein to provide an apparatus and method for a steering control system that does not allow for pivot steering at any time the wheeled vehicle is moving at certain speeds and regardless of the wheeled vehicle's wheel position. It is still another advantage of the preferred embodiments of the invention claimed herein to provide an apparatus and method for a steering control system that does not produce undesirable stress on a stationary wheel and its linkage when a pivoting wheel turns or damage the base pavement. It is yet another advantage of the preferred embodiments of the invention claimed herein to provide an apparatus and method for a steering control system that is not be capable of being accidentally engaged at an unsafe speed and possibly throw the operator off the wheeled vehicle.

Additional advantages of the preferred embodiments of the invention will become apparent from an examination of the drawings and the ensuing description.

Explanation of the Technical Terms

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

As used herein, the term "controller" means any device, mechanism, assembly, or combination thereof that directs the transmission of information or provides commands, including over a network. The term "controller" may include, without limitation, any device, mechanism, assembly, or combination thereof that is controlled by a program either within the device, mechanism, assembly, or combination thereof or in a processor to which the controller is connected.

As used herein, the term "sensor" means any device, mechanism, assembly, or combination thereof that converts an input signal into a measurable quantity and changes the measurable quantity into a useful signal for an information-gathering system.

As used herein, the term "valve" means any device, mechanism, assembly, or combination thereof that allows, halts, or regulates the passage of fluid through a tube or pipe, either manually or automatically.

As used herein, the term "pivot steer" or "pivot steering" means a vehicle turning maneuver whereby the turning radius of the vehicle is decreased. This decrease is typically accomplished by changing (e.g. slowing or stopping) the rotational speed or changing the direction of a specific wheel, track, etc. on one side of the vehicle with respect to the wheel, track, etc. on the opposite side of the vehicle. Typically, a pivot steer is accomplished by changing the rotational speed or direction of the rearmost wheel (or track) on the side of the vehicle towards which the turn is desired (i.e., the left rear wheel is stopped for a leftward pivot turn and the right rear wheel is stopped for a rightward pivot turn).

As used herein, the term "rotational axis" means the axis passing through the center of a wheel of the vehicle, and about which the wheel rotates to allow motion of the vehicle.

As used herein, the term "angular position" means the angle of a turning wheel as measured between two axes. The first axis is the rotational axis of the turning wheel, which changes as the turning wheel pivots to change the direction of the vehicle. The second axis is the rotational axis of the non-turning wheel. In operation, as the vehicle drives forward or backward, the turning wheel and the non-turning wheel have parallel rotational axes, meaning the angular position is zero degrees (0°).

SUMMARY OF THE INVENTION

The current invention comprises a steering control system adapted for use on a vehicle having at least two or more wheels and an automatic pivot steer mode. At least one of the wheels is a driven wheel for providing propulsion to the vehicle by rotating about a central axis. At least one of the wheels is a turning wheel for determining the vehicle's travel direction based on an angular position of the turning wheel. The preferred steering control system comprises a speed sensor adapted to determine a vehicle speed, a steering control device adapted to control the angular position of the turning wheel as the turning wheel moves between a first angular position and a second angular position, a steering sensor adapted to determine the angular position of the turning wheel, a speed control device adapted to alter a rotational speed of at least one wheel of the two or more wheels, and a controller. The preferred controller is further adapted to receive vehicle speed information from the speed sensor and the angular position of the turning wheel from the steering sensor. The controller then determines, based on the vehicle speed information and the angular position, if the vehicle speed is within a predetermined speed range and if the position of the steering control device is within a predetermined angular range. If the vehicle speed is within the predetermined speed range and the angular position of the steering control device is within the predetermined angular range, the preferred speed control device automatically activates to alter the rotational speed or direction of at least one wheel of the two or more wheels from a first operational state having a first minimum vehicle turning radius to a second operational state having a second and smaller minimum turn radius.

The preferred method comprises propelling the vehicle in a desired direction. The steering control device is then moved between a first angular position and a second angular position. The speed sensor then detects the vehicle speed while the steering sensor detects the angular position of the turning wheel. Both the vehicle speed and the angular position of the turning wheel are then provided to the controller. The controller compares the vehicle speed to a predetermined speed range and the turning wheel's angular position to a predetermined angular range. If the values are within the respective predetermined ranges, the controller activates the rotational control device to alter the rotational speed or direction of at least one wheel of the two or more wheels. The alteration in rotational speed or direction results in a change in vehicle operational state from a first operational state having a first minimum vehicle-turning radius to a second operational state having a second and smaller minimum turning radius.

BRIEF DESCRIPTION OF THE DRAWINGS

The presently preferred embodiments of the invention are illustrated in the accompanying drawings, in which like reference numerals represent like parts throughout, and in which:

FIG. 5A is a schematic view of an exemplary vehicle in the normal forward position;

FIG. 5B is a schematic view of an exemplary vehicle in the normal left turn position;

FIG. 5C is a schematic view of an exemplary vehicle in the normal right turn position;

FIG. 5D is a schematic view of an exemplary vehicle in the pivot left turn position;

FIG. 5E is a schematic view of an exemplary vehicle in the pivot right turn.

DETAILED DESCRIPTION

Preferred embodiments of the present invention provide a steering control system that is adapted for use on a vehicle having at least two or more wheels. At least one of the wheels is a driven wheel for providing propulsion to the vehicle by rotating about a central axis. At least one of the wheels is a turning wheel for determining a travel direction of the vehicle. The preferred steering control system comprises a speed sensor, steering control device, a steering sensor, a speed control device, and a controller. The preferred steering control system activates the speed control device resulting in an alteration of the rotational speed of at least one of the wheels.

Figure 1:
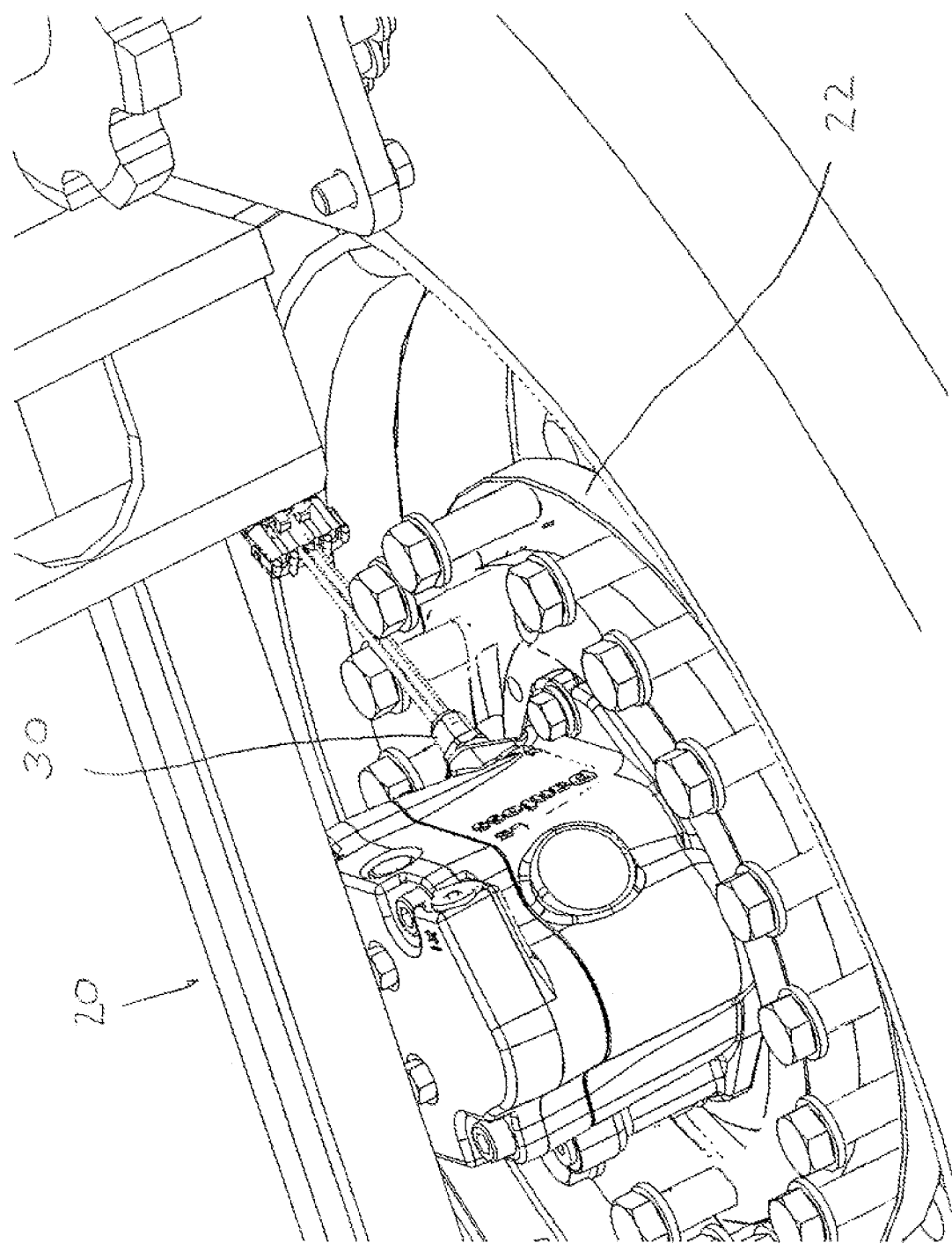
FIG. 1 is a perspective view of a wheel of an exemplary vehicle illustrating the preferred embodiment of the speed sensor in accordance with the present invention.

Referring now to the drawings, there is shown in FIG. 1 a perspective view of an exemplary vehicle 20 having a wheel 22 and a speed sensor 30. In certain embodiments, the vehicle 20 is a road-building machine. In certain embodiments, the vehicle 20 is an agricultural tractor. In certain embodiments, the vehicle 20 is a paving machine. The speed sensor 30 is preferably adapted to determine a vehicle speed by measuring the rotational speed of the wheel 22. The speed sensor 30 is preferably configured detect the speed of the vehicle 20 relative to the ground surface on which the vehicle is traveling using one or more speed measuring techniques (i.e., lasers, light pulses, magnetic pulses, GPS, rotary encoder, tachometer, ground radar, etc.).

Figure 2:
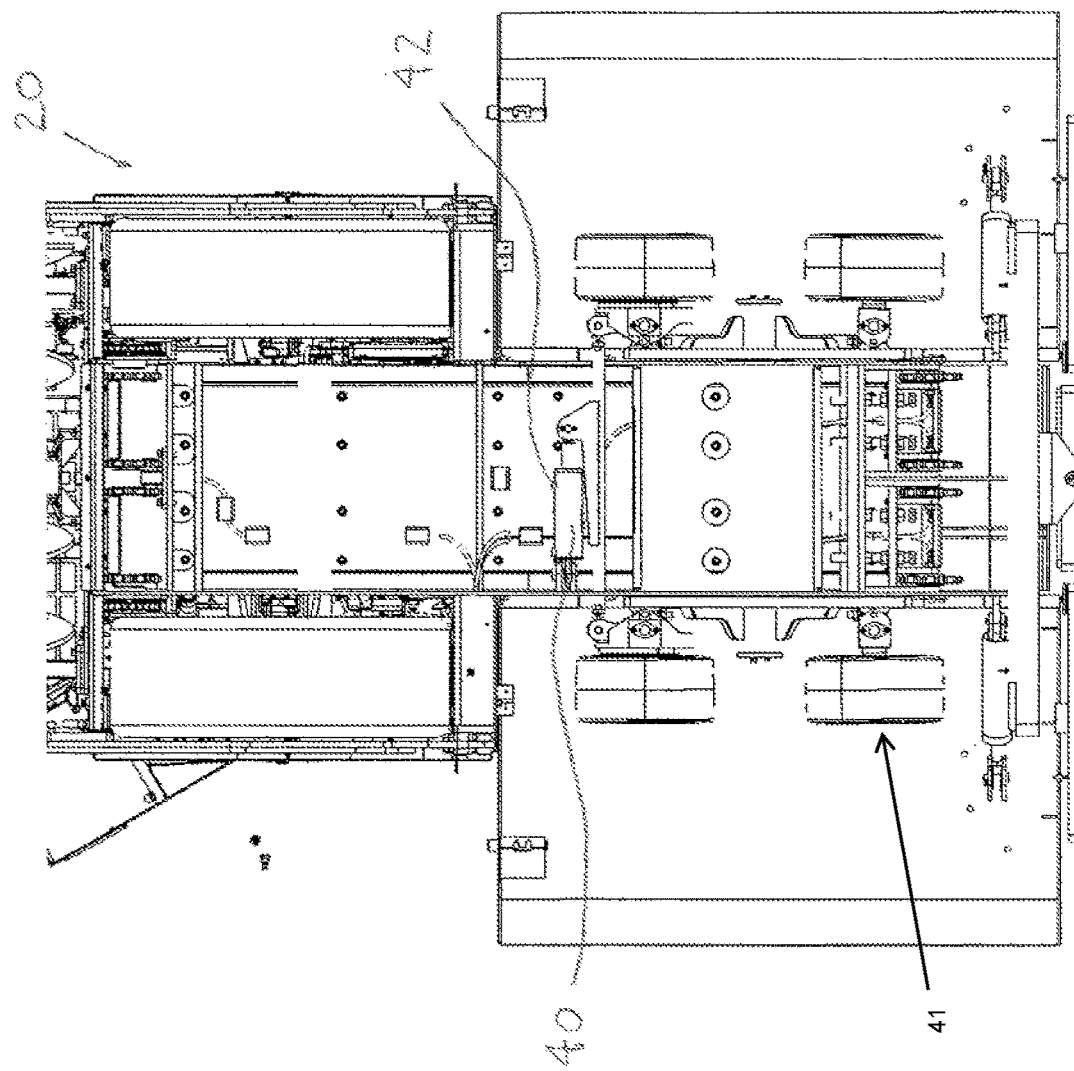
FIG. 2 is a bottom view of the exemplary vehicle illustrated in FIG. 1 showing the preferred embodiment of the steering mechanism and the steering sensor.

Referring now to FIG. 2, a bottom view of exemplary vehicle 20 is illustrated showing a steering control device 40 and a steering sensor 42 according to an embodiment of the present invention. The steering control device 40 is adapted to control an angular positon of a turning wheel 41 of the vehicle, such as when the turning wheel moves between a first angular position and a second angular position. Preferably, the steering control device 40 is a cylinder. The cylinder 40 can control the angular position of the turning wheel 41 directly or via a linkage. In other embodiments, the steering control device 40 is a rack-and-pinion arrangement. In certain embodiments, the steering control device 40 is driven by an electric motor, either in isolation or in combination with a linkage. The steering sensor 42 is adapted to determine an angular position of the turning wheel 41. In certain embodiments of the present invention, the steering sensor 42 determines the angular position of the turning wheel 41 by measuring the length or position of the steering control device or the linkage. For example, as shown in FIG. 2, the steering sensor 42, is mounted to and measures the length of the steering control device 40 (i.e., a cylinder) in order to determine the angular position of the corresponding turning wheel 41. In other embodiments, the steering sensor 42 measures the angular position of the turning wheel based on other suitable measurements (i.e., a knuckle position, tire position, etc.).

In use, the system preferably automatically determines a threshold speed, which is the maximum speed that the vehicle can safely pivot steer, the current speed of the vehicle, and the angular position of the turning wheel(s) 41. Preferably, the threshold speed is preprogrammed based of vehicle characteristics, i.e., size, weight, track width, etc., in certain embodiments of the present invention. In further embodiments, the threshold speed is between 0 feet per minute (fpm) and 400 fpm. Preferably, the system is also configured to calculate a predetermined speed range within which pivot steering may be safely carried out. This determination may be based, at least in part, on the angular position of the turning wheel 41. In preferred embodiments, the maximum speed of the predetermined range is less than the threshold speed so as to provide a safety buffer (i.e., to avoid carrying out pivot steering at the maximum safe speed). For example, the threshold speed might be 400 feet per minute and the predetermined speed range may be between 0 fpm and 350 fpm. Preferably, these calculations are made repeatedly while the vehicle 20 is in motion. In certain embodiments, the predetermined speed range is calculated at a rate of least once per second. In further embodiments, the automatic predetermined speed range calculation function is selectively enabled by an operator. Preferably, pivot steering is permitted only when the angular position of the turning wheel is within a predetermined angular range. For example, in certain embodiments, the predetermined range is approximately eighty percent (80%) to approximately one hundred percent (100%) of the fully turned position. In certain vehicles, this predetermined range equates to approximately 24° or more.

In preferred embodiments, the system automatically compares the current vehicle speed with the threshold speed to determine if pivot steering can be safely carried out. It also preferably considers the angular position of the turning wheel 41. Then, if safe to do so, the system then automatically activates or enables pivot steer mode, which permits pivot steering to take place. More specially, if the current vehicle speed is within the predetermined speed range and the angular position of the turning wheel is within the predetermined angular range, the system enables pivot steer mode. In pivot steer mode, the system is adapted to automatically activate the speed control device to alter the rotational speed or direction of at least one of the driven wheels. The change in speed or reversal in direction of the driven wheel results in a decrease in vehicle turning radius, thereby taking the vehicle from a first operational state, which has a first minimum vehicle turning radius, to a second operational state, which has a second and smaller minimum turning radius. On the other hand, the system also preferably automatically deactivates the automatic pivot steer mode if pivot steering is not safe, such as when the vehicle speed is not within the predetermined speed range or the angular position of the turning wheel is not within the predetermined angular range.

Figure 3:
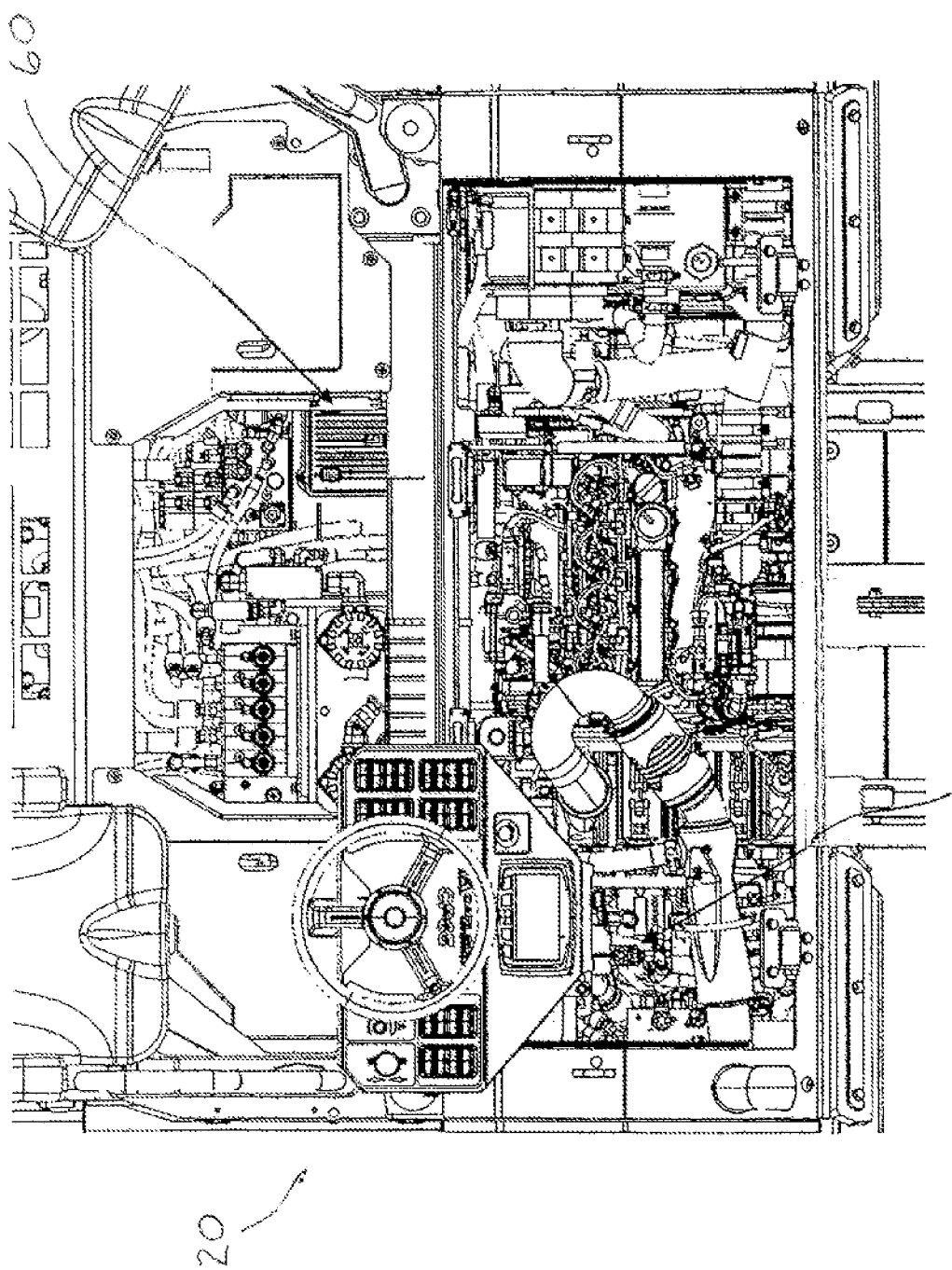
FIG. 3 is a partial sectional top view of the engine compartment of the exemplary vehicle illustrated in FIGS. 1-2 showing the preferred embodiment of the speed control device and the controller.

Referring now to FIG. 3, a partial sectional top view of the engine compartment of exemplary vehicle 20 is illustrated showing a preferred speed control device 50 and controller 60. In preferred embodiments, speed control device 50 is a flow sharing valve. Preferably, the speed control device 50 is in fluid communication with one or more of the two or more wheels and is adapted to alter a rotational speed of said wheel. Here, the flow sharing valve 50 can be moved between an open position, which allows for rotation of the wheel, and a closed position, which prevents rotations of the wheel. In certain other embodiments, the speed control device 50 is a brake. In other embodiments, the speed control device 50 is a pump altering the hydraulic flow providing propulsion to the driven wheel or driven wheels. Preferably, controller 60 is adapted to receive vehicle speed information from the speed sensor 30 and the angular position of the turning wheel from the steering sensor 42. Then, the controller determines, based on the received information, if the vehicle speed is within the predetermined speed range and if the position of the steering control device is within a predetermined angular range. If the speed and angular position are within the predetermined ranges, the controller automatically activates pivot steer mode and sends a command to the speed control device to alter the rotational speed of at least one of the driven wheels from a first operational state wherein the vehicle has a first minimum vehicle turning radius to a second operational state wherein the vehicle has a second and smaller minimum turning radius. In certain embodiments, when the controller determines the vehicle speed is not within the predetermined speed range or the angular positon is not within the predetermined angular range, the controller automatically deactivates pivot steer mode. Upon deactivation of pivot steer mode, a command is sent to the speed control device to return the rotation speed of the driven wheel from the second operational state to the first operational state.

Figure 4:
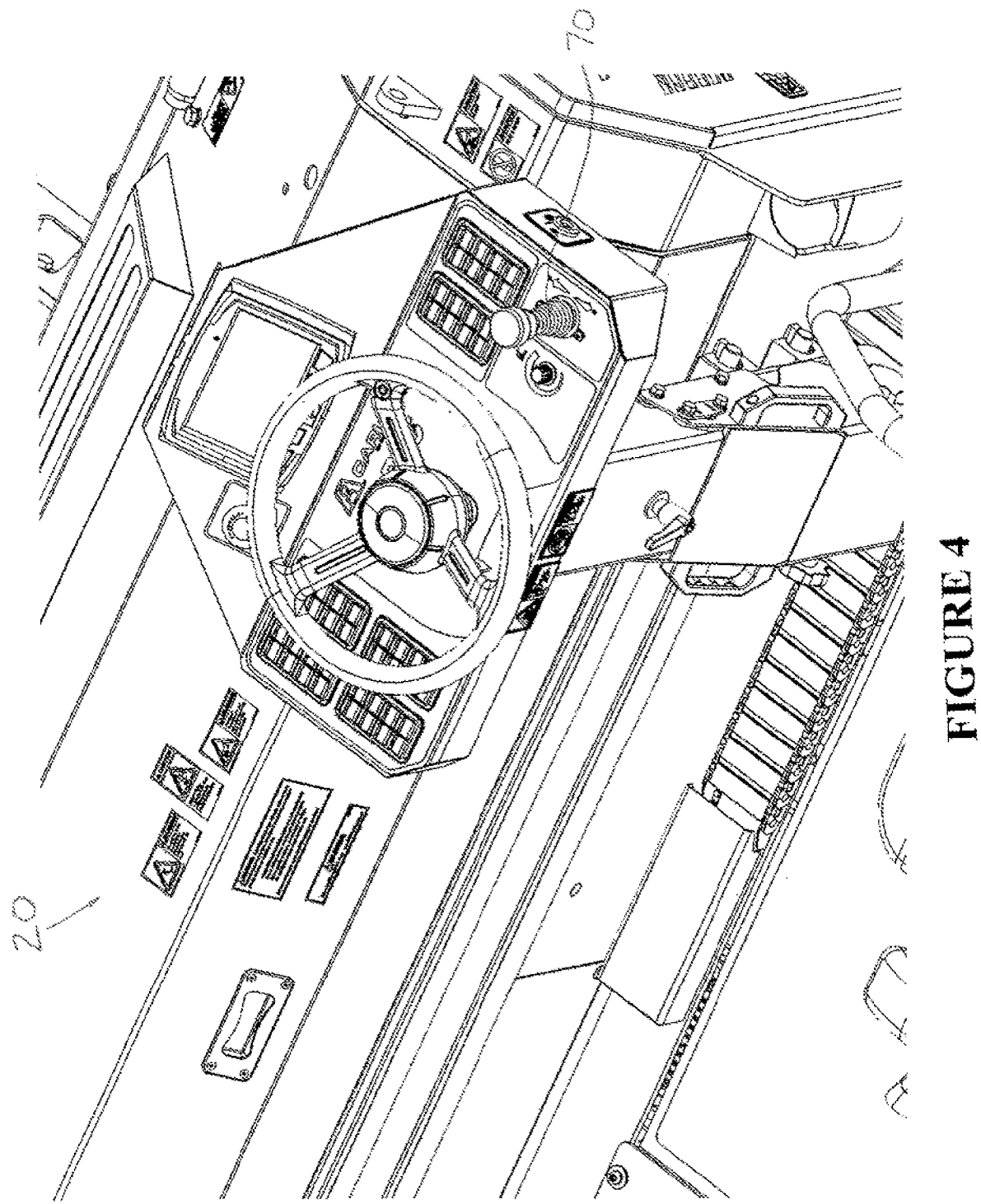
FIG. 4 is a perspective view of cockpit of the exemplary vehicle illustrated in FIGS. 1-3 showing the preferred embodiment of the motion control device.

Referring now to FIG. 4, a perspective view of a cockpit of exemplary vehicle 20 having a motion control device 70 according to a preferred embodiment of the present invention is shown. Preferably, the motion control device 70 is a joystick that is adapted to control the forward-reverse movement of the vehicle 20. In certain embodiments, the joystick 70 is replaced with other suitable motion-control devices, such as a foot controller, a lever, a knob, etc.

Referring now to FIG. 5A, a schematic view of an exemplary vehicle 120 in the normal forward driving position is illustrated. Vehicle 120 includes front left wheel 122, middle left wheel 124, rear left wheel 126, front right wheel 132, middle right wheel 134, and rear right wheel 136. In the normal forward position, all six wheels are substantially parallel to each other and the longitudinal axis A of exemplary vehicle 120. In addition, in the normal forward position, all six wheels are allowed to rotate. Additionally, rotational axis B passes through wheel 126 and wheel 136, which are not angularly adjustable. Turning axis C is depicted as passing through turning wheel 124. Other turning axes pass through other turning wheels (e.g., wheel 122, wheel 132, or wheel 134) and are preferably independent of each other turning axis such that each turning wheel is angularly adjustable (i.e., can rotate clockwise or counterclockwise, as viewed in FIG. 5A) independently of one another. The "angular position" for wheel 124 may be defined as the angle between rotational axis B and turning axis C. As shown in FIG. 5A, in the normal forward position, the angular position of wheel 124 is approximately 0° since axes B and C are parallel with one another. Each of the driven wheels 126 and 136 is provided with an upward facing arrow. These direction and size of these arrows indicate the direction of rotation about rotational axis B and the speed of rotation, respectively. With respect to the speed of rotation, a higher speed of rotation is illustrated as a longer arrow. In this case, the arrows are the same size and are pointed in the same direction, which means that the two driven wheels are rotating in the same direction and at the same speed about axis B, which will cause the vehicle to travel straight forward.

By contrast, as shown in FIG. 5B, the vehicle 120 is shown in a normal (i.e., non-pivot mode) left turn position. In the normal left turn position, front left wheel 122, middle left wheel 124, front right wheel 132, and middle right wheel 134 are turned to the left (i.e., counterclockwise, as shown in FIG. 5B) at an angle relative to longitudinal axis A and turning axis C' is depicted as passing through turning wheel 124. In addition, in the normal left turn position, all six wheels are allowed to rotate. In this turning position the angular position (i.e. the angle between rotational axis B and turning axis C') is a non-zero angle. In this case, the arrow provided with driven wheel 136 is much longer than the arrow provided with driven wheel 126, which indicates that wheel 136 is rotating in the same direction but faster than wheel 126, which will promote a moderate left-hand turn of the vehicle.

Referring now to FIG. 5C, the vehicle 120 is shown in a normal (i.e., non-pivot mode) right turn position. In the normal right turn position, front left wheel 122, middle left wheel 124, front right wheel 132, and middle right wheel 134 are turned to the right (i.e., clockwise, as shown in FIG. 5C) at an angle relative to the longitudinal axis A and turning axis C" is depicted as passing through turning wheel 124. In addition, in the normal right turn position, all six wheels are allowed to rotate. In this turning position the angular position (i.e. the angle between rotational axis B and turning axis C") is a non-zero angle. In this case, the arrow provided with driven wheel 126 is much longer than the arrow provided with driven wheel 136, which indicates that wheel 126 is rotating in the same direction but faster than wheel 136, which will promote a moderate right-hand turn of the vehicle.

Referring now to FIG. 5D, the vehicle 120 is shown in a pivot mode left turn position. In the pivot mode left turn position, front left wheel 122, middle left wheel 124, front right wheel 132, and middle right wheel 134 are turned to the left at an angle relative to the longitudinal axis of exemplary vehicle 120 in a fashion similar to that shown in FIG. 5B. However, unlike the vehicle shown in FIG. 5B, in the pivot left turn position, rear left wheel 126 is not permitted to rotate (as evidence by the "stop" symbol on wheel 126) while the other wheels are permitted to rotate. This will promote an aggressive left-hand pivot turn of the vehicle that has a smaller turn radius compared to moderate left-hand turn of the vehicle shown in FIG. 5B. In certain embodiments, the rotation of rear left wheel 126 is reversed, further decreasing the turning radius of the vehicle.

Referring now to FIG. 5E, the vehicle 120 is shown in a pivot mode right turn position. In the pivot mode right turn position, front left wheel 122, middle left wheel 124, front right wheel 132, and middle right wheel 134 are turned to the right at an angle relative to the longitudinal axis of exemplary vehicle 120 in a fashion similar to that shown in FIG. 5C. However, unlike the vehicle shown in FIG. 5C, in the pivot right turn position, rear right wheel 136 is not permitted to rotate (as evidence by the "stop" symbol on wheel 136) while the other wheels are permitted to rotate. This will promote an aggressive right-hand pivot turn of the vehicle that has a smaller turn radius compared to moderate right-hand turn of the vehicle shown in FIG. 5C. In certain embodiments, the rotation of rear left wheel 136 is reversed, further decreasing the turning radius of the vehicle.

Also disclosed herein is a method for controlling the steering of a vehicle having one or more wheels and an automatic pivot steer mode. The preferred method comprises providing a steering control system as described and claimed herein. The preferred method further comprises propelling the vehicle in a desired direction. The steering control device is then moved between a first angular position and a second angular position. The speed sensor then detects the vehicle speed while the steering sensor detects the angular position of the turning wheel. Both the vehicle speed and the angular position of the turning wheel are then provided to the controller. The controller further compares the vehicle speed to a predetermined speed range and the turning wheel's angular position to a predetermined angular range. If the values are within the respective predetermined ranges, the controller activates the rotational control device to alter the rotational speed or direction of at least one wheel of the two or more wheels. The alteration in rotational speed or direction results in a change in vehicle operational state from a first operational state having a first minimum vehicle turning radius to a second operational state having a second and smaller minimum turning radius. In other words, by slowing down, stopping, or reversing the direction of the wheel, the vehicle makes a tighter turn than otherwise possible, i.e., a pivot turn. In other preferred embodiments, the method also comprises automatically determining a vehicle speed, automatically determining a threshold speed, and automatically determining the steering position. In still other preferred embodiments, the method comprises automatically comparing the vehicle speed with the vehicle speed range, automatically comparing the vehicle speed with the threshold speed, automatically comparing the steering position with the predetermined angular range, and automatically stopping or reversing the rotation of one or more of the one or more wheels.

Figure 6:
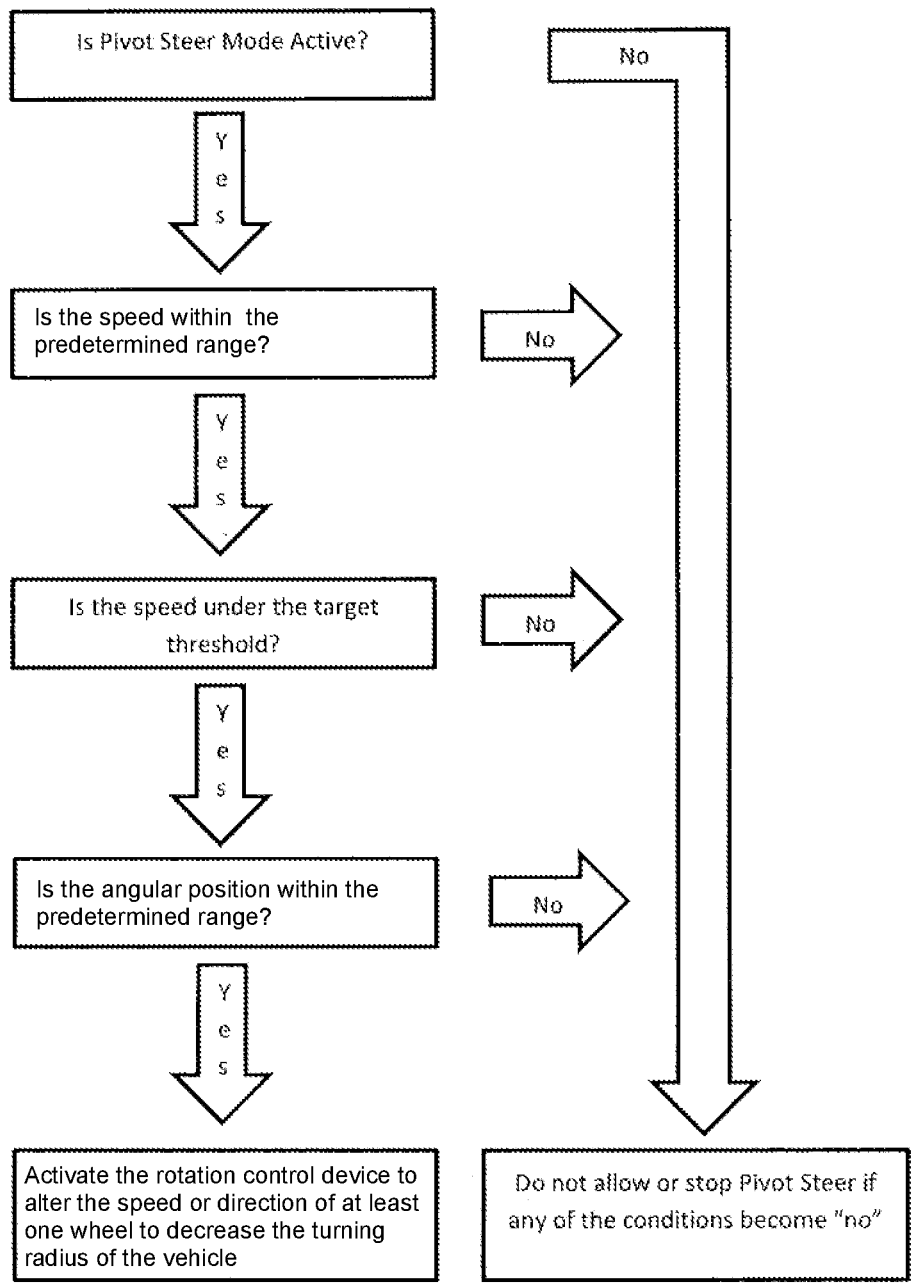
FIG. 6 is a flow chart illustrating the preferred method for controlling the steering of a vehicle.

Referring now to FIG. 6, a flow chart illustrating another preferred method for controlling the steering of a vehicle is illustrated. As shown in FIG. 6, initially the steering control system determines if the vehicle is in automatic pivot steer mode. If the vehicle is not in automatic pivot steer mode, then the steering control system prevents the vehicle from pivot steering. If, on the other hand, the vehicle is in the automatic pivot steer mode, then the steering control system determines if the vehicle speed is within the predetermined speed range. If the vehicle speed is not within the predetermined speed range, then the steering control system prevents the vehicle from pivot steering. If, on the other hand, the vehicle speed is within the predetermined speed range, then the steering control system determines if the vehicle speed is below the threshold speed. If the vehicle speed is not below the threshold speed, then the steering control system will prevent the vehicle from pivot steering. If, on the other hand, the vehicle speed is below the threshold speed, then the steering control system determines if the steering sensor is indicating an angular position of the turning wheel within a predetermined angular range. If the steering control system determines that the steering sensor is not indicating an angular position of the turning wheel within a predetermined angular range, then the system prevents the vehicle from pivot steering. If, on the other hand, the steering control system determines that the steering sensor is indicating an angular position of the turning wheel within a predetermined angular range, then the steering control system activates the speed control device and alters the speed or direction of the rotation of the rear wheel on the inside of the turn. In other preferred embodiments, the method includes the step of the controller continuously determining the vehicle speed and angular position of the turning wheel during a pivot steer. If the vehicle speed or angular position of the turning wheel are not within the respective predetermined ranges, the controller deactivates the speed control device. The deactivation of the speed control device returns the vehicle from the second operational state to the first operational state.

In operation, several advantages of the preferred embodiments of the steering control system are achieved. For example, the preferred embodiments of the invention claimed herein provide an apparatus and method for a steering control system that automatically pivot steers the vehicle. The preferred embodiments of the invention claimed herein also provide an apparatus and method for a steering control system that is not undesirably labor-intensive and unsafe. The preferred embodiments of the invention claimed herein further provide an apparatus and method for a steering control system that does not allow for pivot steering at any time the vehicle is moving at certain speeds and regardless of the machine's wheel position. The preferred embodiments of the invention claimed herein still further provide an apparatus and method for a steering control system that does not produce undesirable stress on a stationary wheel and its linkage when a pivoting wheel turns or damage the base pavement. In addition, the preferred embodiments of the invention claimed herein provide an apparatus and method for a steering control system that is not be capable of being accidentally engaged at an unsafe speed and possibly throw the operator off the vehicle.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A steering control system adapted for use on a vehicle having two or more wheels that are each configured to rotate about a rotational axis, including at least one wheel of the two or more wheels that is a driven wheel for providing propulsion to the vehicle and at least one wheel of the two or more wheels that is a turning wheel for determining a travel direction of the vehicle, the steering control system comprising:
   a speed sensor adapted to measure a vehicle speed of the vehicle;
   a steering sensor adapted to measure an angular position of the turning wheel;
   a steering control device adapted to selectively alter the angular position of the turning wheel
   a speed control device adapted to selectively alter a rotational speed of the driven wheel; and
   a controller in communication with the speed sensor, the steering sensor, the steering control device, and the speed control device,
   wherein the controller is adapted to receive the vehicle speed from the speed sensor, to receive the angular position of the turning wheel from the steering sensor, to determine if the vehicle speed is within a predetermined speed range, and to determine if the angular position of the turning wheel is within a predetermined angular range; and
   wherein, when the controller determines that the vehicle speed is within the predetermined speed range and the angular position of the turning wheel is within the predetermined angular range, the controller automatically activates a pivot steer mode and sends a command to the speed control device to alter the rotational speed of the driven wheel from a first operational state wherein the vehicle has a first minimum vehicle turning radius to a second operational state wherein the vehicle has a second and smaller minimum turning radius.

2. The steering control system of claim 1 wherein, when the controller determines that the vehicle speed is not within the predetermined speed range or the angular position of the turning wheel is not within the predetermined angular range, the controller automatically deactivates pivot steer mode and sends a command to the speed control device to return the rotational speed of the driven wheel from the second operational state to the first operational state.

3. A motorized vehicle having one or more wheels that is equipped with and is adapted to use the steering control system of claim 1.

4. The motorized vehicle of claim 3 wherein the motorized vehicle is a road-building machine.

5. The motorized vehicle of claim 4 wherein the road-building machine is a paving machine.

6. A vehicle control method comprising the steps of:
   providing a vehicle having two or more wheels that are each configured to rotate about a rotational axis, including at least one wheel of the two or more wheels that is a driven wheel for providing propulsion to the vehicle and at least one wheel of the two or more wheels that is a turning wheel for determining a travel direction of the vehicle;

providing a steering control system comprising:
- a speed sensor adapted to measure a vehicle speed of the vehicle;
- a steering sensor adapted to measure an angular position of the turning wheel;
- a steering control device adapted to selectively alter the angular position of the turning wheel
- a speed control device adapted to selectively alter a rotational speed of the driven wheel; and
- a controller in communication with the speed sensor, the steering sensor, the steering control device, and the speed control device, propelling the vehicle in a desired direction with the driven wheel in a first operational state wherein the vehicle has a first minimum vehicle turning radius;

detecting the vehicle speed with the speed sensor;

detecting the angular position of the turning wheel with the steering sensor;

with the controller, determining if the vehicle speed is within an predetermined speed range and if the angular position of the turning wheel is within a predetermined angular range; and if the vehicle speed is within the predetermined speed range and the angular position of the turning wheel is within the predetermined angular range, automatically activating a pivot steer mode with controller, wherein, in pivot steer mode, the controller sends a command to the speed control device to alter the rotational speed of the driven wheel from the first operational state to a second operational state wherein the vehicle has a second and smaller minimum turning radius.

* * * * *